United States Patent

[11] 3,584,421

| [72] | Inventors | Ernst Loh<br>Wetzlar;<br>Wilhelm Doll, Burgsolms, both of,<br>Germany |
|---|---|---|
| [21] | Appl. No. | 845,848 |
| [22] | Filed | July 29, 1969 |
| [45] | Patented | June 15, 1971 |
| [73] | Assignee | Firma Wilhelm Loh, K. G.<br>Optikmaschinenfabrik |
| [32] | Priority | Aug. 6, 1968 |
| [33] | | Germany |
| [31] | | P 17 52 922.5 |

[54] MARGINAL MACHINING
9 Claims, 8 Drawing Figs.

[52] U.S. Cl. .................................................... 51/101, R
51/50 R, 51/215 CP
[51] Int. Cl. .................................................... B24b 7/00,
B24b 9/00, B24b 5/00

[50] Field of Search........................................... 51/101,
101.1, 50, 215.3, 215.4

[56] References Cited
UNITED STATES PATENTS

| 2,091,456 | 8/1937 | Rybick .......................... | 51/101 |
| 2,906,065 | 9/1959 | Reaser........................... | 51/101 |
| 3,525,182 | 8/1970 | Ritter et al..................... | 51/101 |
| 3,525,181 | 8/1970 | Carson .......................... | 51/101 |

*Primary Examiner*—James L. Jones, Jr.
*Attorney*—Watson, Cole, Grindle and Watson ABSTRACT: A machine for the marginal machining of small noncircular workpieces by means of grinding wheels in which a workpiece is lifted off a magazine between the ends of two spindles and a master pattern on one of the spindles is traced by a feeler aligned with a grinding wheel in such a way that the wheel grinds the workpiece according to the pattern.

Inventors
Ernst Loh
Wilhelm Doll
By
Watson Cole Grindle & Watson
Attys.

MARGINAL MACHINING

BACKGROUND OF THE INVENTION

This invention relates to a machine for the marginal machining of noncircular workpieces, e.g. hard metal cutting plates or blocks of hard metal, by means of grinding wheels, in which the workpieces are clamped between two vertical and axially mutually aligned spindles and in which there is provided a feed mechanism comprising a magazine plate rotatable step by step with workpiece holders situated on a circle and with perforations or holes beneath the workpiece holders, the magazine plate engaging in such manner between the spindles that the lower spindle can lift the workpiece off the magazine plate.

The rim of small noncircular workpieces can be machined precisely by virtue of the fact that the workpieces are clamped between two workpiece-holding spindles rotating relatively slowly, and that a rapidly revolving grinding wheel is displaced relative to the rim of the workpiece in such manner that the required shape is imparted to the workpiece. The displacement of the grinding wheel relative to the workpiece can be controlled in a particularly simple manner by means of a copying method, in which one of the work-holder spindles has a master or pattern element arranged on it, whereof the contour is identical to the required workpiece outline, and a feeler slides along this pattern, which feeler is aligned coaxially with the grinding wheel and at its contact area has the same radius as the grinding wheel.

The relatively simple method described however requires a precise alignment of the workpiece relative to the pattern element situated on one of the work-holding spindles, if as is always desirable, the tolerance allowed for machining on the workpieces is to be kept as small as possible. In the embodiment of the invention to be described there is provided a machine with a feed mechanism arranged, in such a manner that the workpieces are grasped automatically by the workpiece spindles in precise alignment with the pattern element.

In this embodiment the magazine plate has arranged on it workpiece holders which hold the workpiece in a definite position relative to both the magazine plate and to the patterned surfaces on one of the spindles corresponding to the rim to be machined, and there is provided a device for braking or stopping the spindle with the patterned surfaces in the same position, the workpieces being so directed relative to the magazine plate that they are aligned with the pattern surfaces of the spindle when stopped.

It is thus possible, without great difficulty, on the one hand to immobilize the workpieces in a precisely defined position by means of an appropriate holding device, to stop the magazine plate in a precisely defined position after performing an advance step, and since it is possible moreover to arrest the workpiece-holding spindle equally in a precisely defined position, each workpiece is in a position precisely aligned with the pattern surfaces prior to its reception by the workpiece-holding spindles. A precise alignment of the workpieces on the workpiece-holding spindles is thus obtained in structurally simple manner.

In a particular embodiment of the invention, the axial displacements of the spindles are controllable in such a manner that the spindles clamp the workpiece fast between them prior to lifting it off the magazine plate. This ensures that the workpieces cannot turn relative to the workpiece-holding spindle having the patterned surfaces whilst being lifted off the magazine plate, e.g. owing to shaking or to other forces acting on the workpieces. Prior to being removed from the workpiece-holding device which positions it precisely relative to the magazine plate, the workpiece is clamped fast between the two workpiece-holding spindles before being lifted out of the workpiece-holding device.

For the machining of essentially plano-parallel workpieces, the clamping faces of the holding spindles are made slightly concave. Punctiform contact which could occur in the case of holding faces which are not slightly concave, if a roughness is present on the workpiece, is thus avoided.

Each workpiece-holder may have contact faces for the lateral faces of the workpieces and a thrust spring pressing the workpiece against these contact faces, this spring is preferably a leaf spring. Play-free seating of the workpieces in the holding device coordinated therewith, is secured by this spring-loaded thrust of the workpiece against contact faces.

Each thrust spring is preferably coordinated with a stop which limits its path in the direction of the motion which provides contact with the workpiece, this stop being so matched to the workpiece that the thrust spring is lifted off the stop when retaining an unmachined workpiece, while it bears against the stop when a machined workpiece lies on the magazine plate. This ensures in a simple manner that the thrust spring, after withdrawal of the workpiece, does not impede the reinsertion of the machined workpiece into the workpiece-holding device.

In a simple embodiment of the aforesaid holding device, the thrust springs are leaf springs and are secured by holding pins fastened on the magazine plate, each holding pin simultaneously acting as a stop for an adjacent spring.

The device for stopping the spindles can comprise a permanently applied or electromagnetically operated brake, which acts on the spindle itself or preferably on a spindle or shaft driving one of the spindles, the stopping of the drive or the braking or stopping action being performed by means of end-of-travel or terminal switches as a function of the shaft position, these switches being operated in a particular angular position of the spindle. In a preferred embodiment of such a stopping device employing terminal switches, a terminal switch is incorporated in each case on a slow-running shaft as well as on a fast-running shaft of the transmission for the drive of the workpiece-holding spindles, the slow-running shaft performing a single revolution only during the machining of a workpiece, and an interlock circuit or the like being incorporated which does not allow the terminal switch coordinated with the fast-running shaft to be actuated or the purpose of stopping the drive and/or of initiating a braking or stopping action until the terminal switch coordinated with the slow-running shaft has been actuated. Practical tests on the machine have shown that an adequately precise stopping action for the purpose of the present machine is possible by means of a stopping device of this kind, so that after stopping, the patterned "quadrilateral" or shank of the spindle is aligned with sufficient precision relative to the workpiece. Precision figures of plus or minus one-half can easily be achieved.

Cam plates having curves so matched that the lower workpiece-holding spindle lifts the workpiece off the magazine plate before the upper workpiece-holding spindle presses on the workpiece, may be incorporated to control the lifting and lowering motions of the workpiece-holding spindles.

SUMMARY

According to the present invention there is provided a machine for the marginal machining of noncircular workpieces, by means of grinding wheels, comprising two vertically arranged and mutually axially aligned spindles between which a workpiece may be gripped, a feed mechanism for the workpieces including a magazine rotatable in a step by step manner, workpiece holders carried by the magazine, the magazine defining a hole or perforation beneath each workpiece holder and being arranged between the spindles in such a way that the lower spindle can lift a workpiece off the magazine and the workpiece holders being arranged to secure a workpiece in a definite position relative to the magazine, template or pattern faces corresponding to the edge to be machined formed on one of the spindles and means for stopping the spindle having the template or patterned faces in a given position, the workpieces being so arranged relative to the magazine that they are aligned with the patterned faces of the said spindle when stopped.

BRIEF DESCRIPTION OF THE DRAWINGS

An embodiment of the invention will now be described with reference to the accompanying drawings in which.

DESCRIPTION OF THE PREFERRED EMBODIMENT

Figure 1:
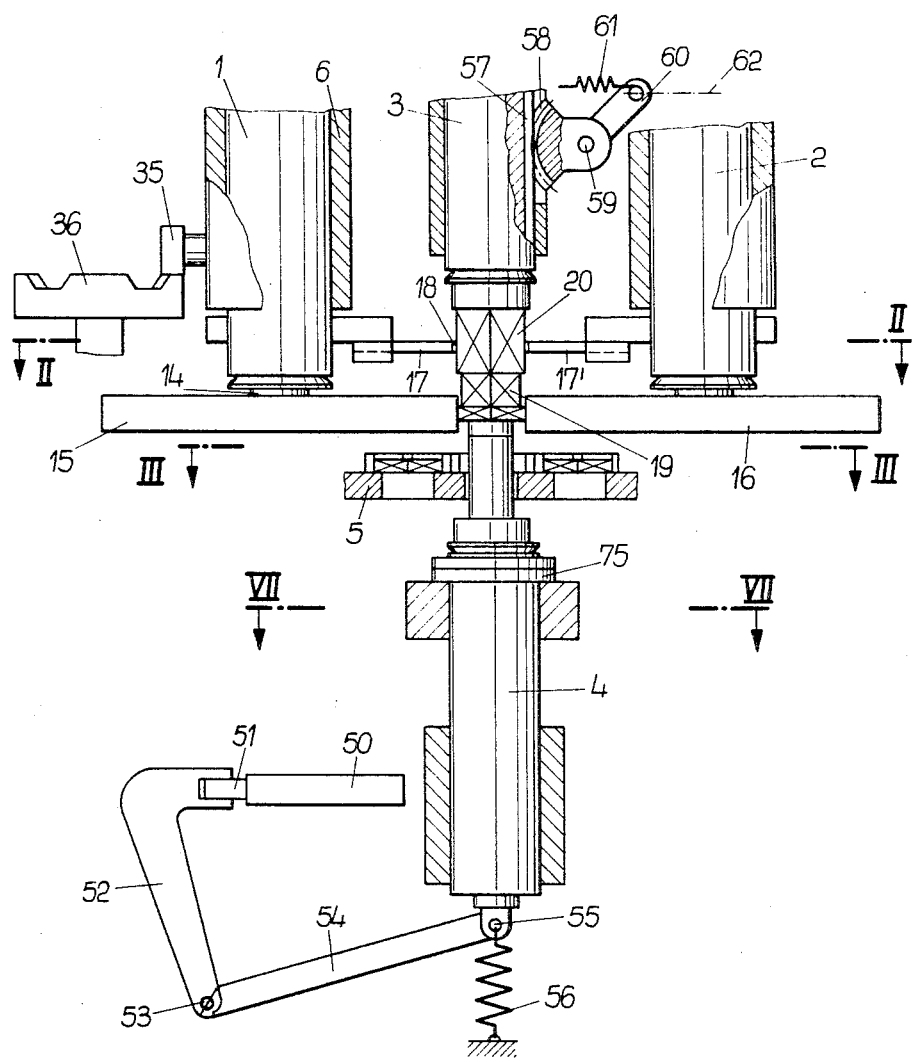
FIG. 1 shows a partially sectioned elevation of a machine.
Figure 2:
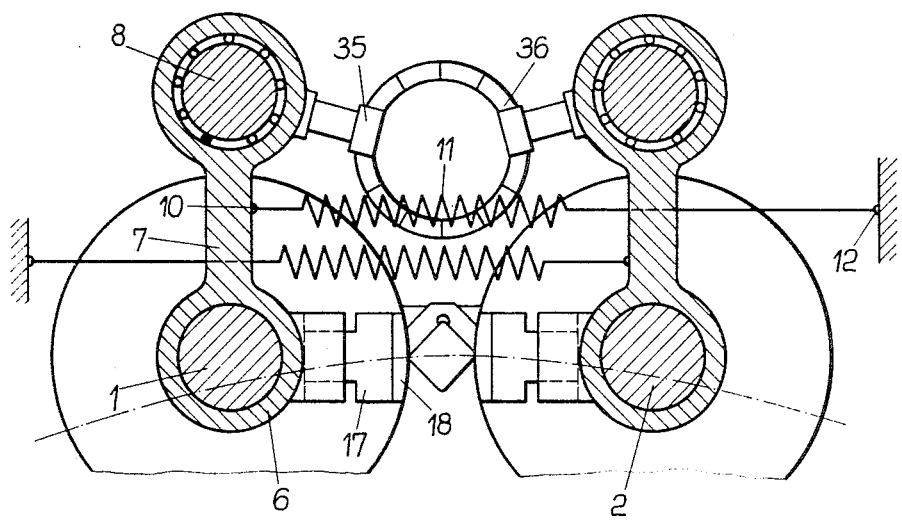
FIG. 2 shows a cross section through the machine along the lineII–II in FIG. 1.

The machine diagrammatically illustrated in FIGS. 1 and 2 has two grinding spindles 1 and 2, which are set parallel to each other, an upper workpiece-holding spindle 3 and a lower workpiece-holding spindle 4 coaxially aligned with it, as well as a feed mechanism comprising a magazine plate 5 rotatable step by step. The structure of these principal elements and their cooperation are described in detail below.

The grinding spindles 1 and 2 are of identical structure and their structure will be described with reference to grinding spindle 1. A unit 6 receiving the grinding spindle is situated at the extremity of a pivot lever 7 (FIG. 2) which is journaled with a ball bearing block 9 on a column 8. The ball bearing block 9 allows the pivot lever 7 to be pivoted easily on the column 7 as well as to be displaced along the column 8. The pivot lever 7 has a traction spring 11 hooked to it at 10, the other extremity of the spring is hooked to the machine case, which is not illustrated, at 12. The spring 11 thus tends to turn the pivot lever 7 anticlockwise as seen in FIG. 2. As may be seen from FIG. 2, the spring coordinated with the grinding spindle 2 tends to turn the pivot lever of the grinding spindle 2 in the opposite direction.

On the rear extremity of the pivot lever 7 encircling the ball bearing block 9 there is arranged a roller 35 which bears on a cam plate 36. To simplify the illustration, the cam plate has not been shown in its actual position in FIG. 1, but displaced outwards towards the left. It is plain that as the cam plate 36 turns, the lever 7, and thus the spindle 1, will be raised and lowered. As is apparent from FIG. 2, the cam plate 36 also serves the purpose of raising and lowering the spindle 2.

The grinding spindle assembly comprises the spindle 1, the shaft 14 and an electric driving motor not illustrated in the drawings. At its lower end, the grinding spindle assembly carries a grinding wheel 15 employed for machining the workpiece. The grinding wheel 15 is of coarser grain than the grinding wheel 16 associated with the grinding spindle 2 and is employed for roughing cuts, whereas the finer-grained grinding wheel 16 is employed for finishing passes. The grinding spindle 1 moreover has firmly joined to it a feeler 17 which externally has a circular segment face 18. This segment face 18 has exactly the same radius as the grinding wheel 15, also having its center aligned precisely on the axis of the grinding wheel.

Figure 8:
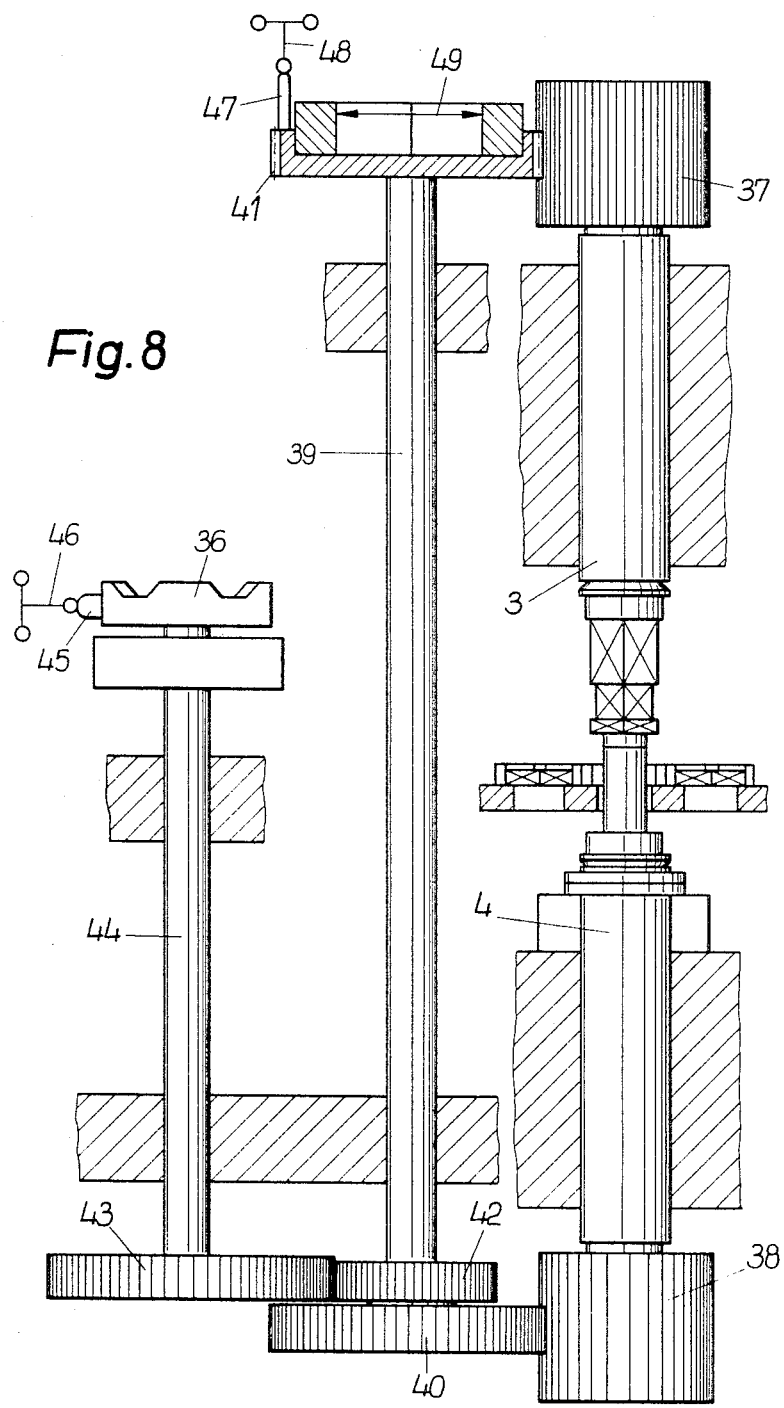
FIG. 8 shows a diagrammatic illustration of the rotary drive for the workpiece-holding spindles.

The rotary drive for the workpiece-holding spindles 3 and 4 is apparent from FIG. 8. At the upper extremity of the upper workpiece-holding spindle there is situated a gearwheel 37 and at the lower extremity of the lower workpiece holding spindle there is situated a gearwheel 38. A so called synchronous shaft 39 is arranged for synchronization of the rotation of the spindles 3 and 4. This synchronous shaft carries a gearwheel 40 on its lower extremity, and a gearwheel 41 on the upper extremity. These two gearwheels mesh with the gearwheels 37,38 on the workpiece holding spindles. It is plain that with an equal number of teeth of the gears 37,38 on the one hand and 41,40 on the other hand, the two spindles are driven at the same speed of revolution. For its part, the synchronizing shaft 39 is driven through the gearwheel 42 firmly joined to it. This gearwheel meshes with a gearwheel 43 which is secured on a shaft 44. The cam 36 for the raising and lowering of a grinding spindle is situated on the upper extremity of the shaft 44.

A stop 45 for the actuation of a terminal switch 46 is provided on the periphery of the cam 36. A stop 47 for the actuation of a terminal switch 48 is similarly provided on the gearwheel 41. The gearwheel 41 moreover cooperates with a break 49, by means of which the gearwheel 41 may also be braked during operation, to cancel the lost motion in the gear mechanism preceding the same. The circuit for the driving motor of the spindles 3 and 4 is closed by means of the terminal switches 46,48. The actuation of the switch 48 is effective only if the switch 46 had been operated. It is thus possible to stop the drive only after a complete revolution of the cam 36.

The gear mechanism has not been drawn to scale in FIG. 8. The transmission increments are substantially greater in reality. The transmission ratio should amount to an integral number moreover, so that upon effective actuation of the switch 48, the workpiece-holding spindles 3,4 are situated in a position in which the pattern faces are aligned with the workpiece faces.

The drive for raising and lowering the workpiece-holding spindles 3 and 4 is illustrated diagrammatically in FIG. 1. The lifting and lowering of the lower workpiece-holding spindle 4 is performed by a cam 50 which has a feeler roller 51 in contact with its periphery. This feeler roller 51 is journaled on a lever 52 which is firmly secured on a shaft 53 which is journaled in the machine case. The shaft 53 also has firmly secured to it a lever 54 which is articulated at 55 to the lower extremity of the workpiece-holding spindle 4. The workpiece-holding spindle 4 is drawn downwards by a spring 56.

A rack or toothed bar 57 is arranged on the upper workpiece-holding spindle, for displacement of the spindle, a toothed segment 58 engaging therein. The toothed segment 58 is pivotally journaled at 59 and is firmly connected to a lever 60. The lever 60 has a traction spring 61 acting on it, which tends to turn the toothed segment 58 anticlockwise, thus tending to press the upper workpiece-holding spindle 3 downwards. An action contrary to that of the spring 61 may be exerted by means of the Bowden cable indicated by the dash-dotted line 62. This Bowden cable is equally operated by a cam plate, which is not shown in the drawings however. The toothed segment 58 with the rack 57, the lever 60 and spring 61, is shown displaced through 90° in FIG. 1.

The lower part 19 of the upper workpiece-holding spindle 3 is formed as a square. Above this part is situated another square part 20 the cross section of which is precisely equal to the required cross section of the workpiece 21. The square part 20 acts as a pattern surface, the feelers 18 being in contact with the same. The lower workpiece-holding spindle 4 has a circular cross section with a diameter of such size however that the outline of the lower spindle 4 cannot project outwards at any point beyond the square 19.

Figure 3:
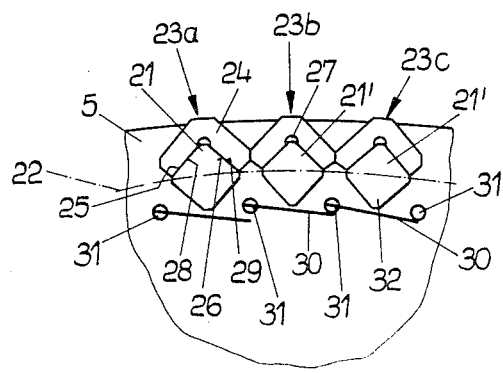
FIG. 3 shows a partial plan view of the magazine plate along the line III–III in FIG. 1, FIGS. 4 to 6 show different operational stages of the machine.

The magazine plate 5 will now be described in detail with reference to FIG. 3. The magazine plate 5 is circular. On a pitch circle 22 of the magazine plate, workpiece-holding devices 23a to 23c are situated equidistantly. Each workpiece-holding device 23 has an angle element 24 on which are formed two contact faces 25,26 for the workpieces 21. These contact faces are machined precisely and are separated from each other by a recess 27 so that the lateral faces 28,29 of the square workpiece, being a small cutting block for a metal working tool in this case, can be brought to bear on the contact faces 25,26.

Each workpiece-holding device 23a to 23c is coordinated with a leaf spring 30 which is secured on a holding pin 31. Each leaf spring 30 is of such length that it reaches as far as the pin 31 of an adjacent workpiece-holding device. An as yet unmachined workpiece is positioned in the workpiece-holding device 23a, whereas already machined small blocks are situated in the holding devices 23b, 23c. It is apparent from FIG. 3, that the blank blocks, which have a greater circumference than the machined blocks, depress the contact spring a little, so that the spring can resiliently press the blocks against the contact faces 25,26 on the securing angle 24. The machined workpieces 21' have however become so small that a small gap is formed between the springs 30 and the corners 32 of the machined workpieces. The springs 30 bear against the holding pins 31 which simultaneously act as stops. Thus, in a simple manner, it is arranged that the thrust springs 30 do not impede the reinsertion of machined workpieces 21' into the workpiece-holding devices 23b, 23c.

Figure 7:
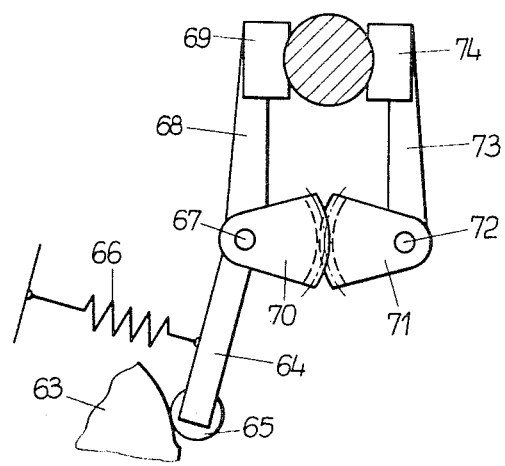
FIG. 7 shows a section along the line VII–VII in FIG. 1.

FIG. 7 shows a device for the axial immobilization of the workpiece-holding spindles during machining. When the workpiece-holding spindles 3 and 4 are fully raised, the device shown in FIG. 7 establishes the axial position of the spindles. The device according to FIG. 7 has a cam 63 on which a roller 65 rolls. The roller 65 is journaled on the extremity of a feeler lever 64 which is drawn towards the left as seen in FIG. 7, by a spring 66. The lever 64 is rotatably journaled at 67. A bearing block 69 is arranged on its branch 68 situated beyond the pivot point 67. The lever 64,68 is firmly joined to a toothed segment 70 which meshes with a toothed segment 71. This toothed segment 71 is journaled at 72 and is firmly connected to a branch 73, corresponding to the branch 68, on which a bearing block 74 is similarly arranged.

When the workpiece-holding spindles 3,4 are fully raised, the branch 64 is pivoted towards the left as seen in FIG. 7, by means of the cam 63, the bearing blocks 69,74 being pivoted towards the spindle 4 (see also FIG. 1). The spindle 4 then bears with a collar or flange 75 on the blocks 69,74. The cam plates controlling the lifting and lowering motions of the spindles are disengaged from the roller 51 and the actuating device for the Bowden cable 62 and the workpiece is then held fast by the force of the spring 61 which presses the upper spindle 3 downwardly.

The machine described above according to the invention operates as follows.

Figures 4, 5, 6:
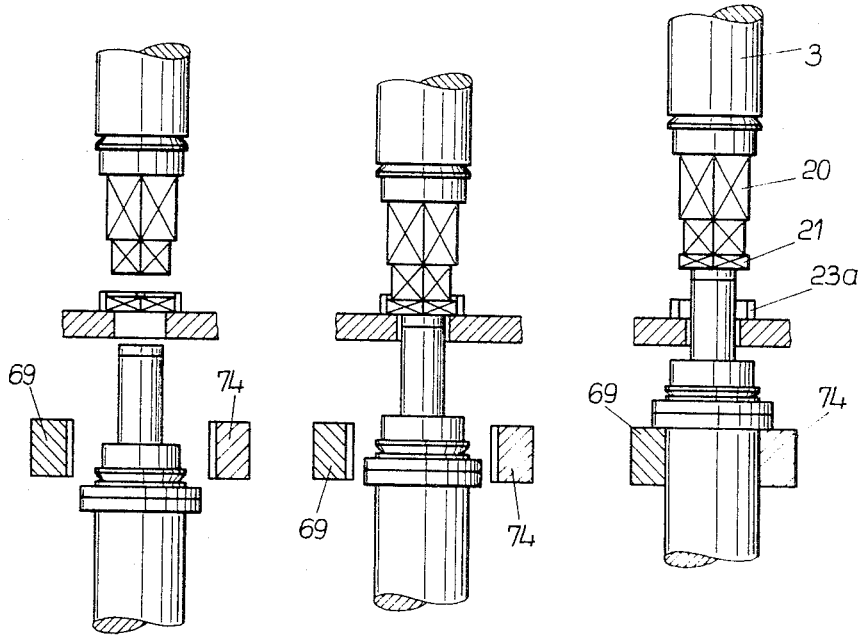

Different operational stages are illustrated in FIGS. 4 to 6. FIG. 6 shows the position in which the workpiece-holding spindles 3 and 4 are situated relative to the magazine plate 5 when this magazine plate performs a switching step. FIG. 4 already illustrates the end of this switching step. At the end of this switching step, the workpiece-holding device 23a is in a position such that the workpiece 21 is precisely aligned on the pattern square part 20 of the upper spindle 3, i.e. the peripheral faces of the workpiece 21 extend precisely parallel to the faces of the pattern square part 20. To this end, the upper workpiece-holding spindle 3 was stopped in a precisely determined position. This stopping at a precisely defined position is accomplished by means of the system illustrated in FIG. 8. After one complete revolution of the cam plate 36 occurring during the time in which the workpiece had been machined completely, the terminal switch 46 is actuated. This establishes a condition in a circuit, which is not shown, which renders it possible to close the circuit for the driving motor of the spindles 3,4, during the next actuation of the terminal switch 48. Since the brake 49 is constantly in action, the switching off of the drive suddenly stops the synchronous shaft 39 and thus also the two workpiece-holding spindles 3 and 4. A perforation or hole 33 situated below the workpiece-holding device is aligned precisely on the axes of the workpiece-holding spindles 3 and 4.

The workpiece-holding spindles 3 and 4 are then displaced in an axial direction by means of the cam plate 50 and of the other cam plate coordinated with the Bowden cable 62, until they have reached the position according to FIG. 5. In this position, they firmly grip the workpiece 21 between them, that is to say with a force such that the workpiece cannot be twisted relative to the workpiece-holding spindles under the forces applicable in this case (grinding wheel thrusts). The two spindles 3 and 4 are then jointly displaced upwards, that is to say until the collar or flange 75 is situated a little above the bearing blocks 69,74. The bearing blocks 69,74 then swing inwards, after which the roller 51 (FIG. 2) is disengaged from the cam 50. The spring 61 (FIG. 1) then presses the spindle 3 and thus, under simultaneous gripping of the workpiece 21, the lower spindle 4 downwards until the collar 75 bears on the blocks 69,74. The workpiece-holding spindles 3 and 4 are then brought into rotation, as are the grinding wheels 15,16. The grinding wheels machine the workpieces consecutively. The coarse-grained grinding wheel 15 comes into operation first, taking a roughing cut on the rim of the workpiece 21. During the machining operation, the pivot lever 7 performs a reciprocating displacement which is controlled by the sliding of the feeler 17 on the pattern square part 20. It is clear that in view of the coincidence between the radius of the scanning face 18 with the radius of the grinding wheel 15, this grinding wheel 15 is displaced in such a manner that it attempts to generate an outer face of the workpiece which corresponds precisely to the form of the pattern square part 20. The finishing grinding wheel 16 is brought into operation after completion of rough grinding. Its motion is equally controlled by the abutment of the feeler 17' on the pattern square part 20. During the grinding operation, the roller 35 rolls on the cam 36, the grinding spindles thereby being raised and lowered. An oscillatory motion and thus uniform wear on the grinding wheels, is accomplished thereby.

On completion of the machining operation, the workpiece-holding spindles 3 and 4 are again lowered together until they reach the position shown in FIG. 5. The workpiece-holding spindles are then displaced to the position shown in FIG. 4, after which another switching step in initiated for the further displacement of the magazine plate 5. The placing of the finish-ground workpiece into the workpiece-holding device is not impeded by the thrust spring 30 since, as already stated with reference to FIG. 3, this spring came into abutment on the adjacent pin 31 thereby being held at such distance from the contact faces 25,26 that the extreme corner of the machined workpiece is situated at a small radial distance from the thrust spring.

The pattern square part may also be of grater size than the workpiece. In this case, the scanning face no longer corresponds to the diameter of the grinding wheels. The scanning face then has a different shape, obtainable by recalculation. A higher precision of the motion can be accomplished by employing a pattern square of grater size. The workpieces may, of course, be of a different shape from a square, e.g. a triangular shape. The pattern faces on the workpiece-holding spindle 3 would then have to be of corresponding form.

We claim:

1. A machine for the marginal machining of noncircular workpieces, by means of grinding wheels, comprising two vertically arranged and mutually axially aligned spindles between which a workpiece may be gripped, a feed mechanism for the workpieces including a magazine rotatable in a step by step manner, workpiece holders carried by the magazine, the magazine defining a hole or perforation beneath each workpiece holder and being arranged between the spindles in such a way that the spindle can lift a workpiece off the magazine and the workpiece holders being arranged to secure a workpiece in a definite position relative to the magazine, template or pattern faces corresponding to the edge to be machined formed on one of the spindles and means for stopping the spindle having the template or patterned faces in a given position, the workpieces being so arranged relative to the magazine that they are aligned with the patterned faces of the said spindle when stopped.

2. A machine according to claim 1, having means for controlling the axial displacements of the spindle in such a manner that the spindles grip the workpiece between them prior to lifting it off the magazine plate.

3. A machine according to claim 2 wherein the gripping faces of the spindles have slightly concave surfaces for gripping substantially plano-parallel workpieces.

4. A machine according to claim 1 in which a workpiece holder has contact faces for the lateral faces of the workpiece and a spring arranged to press the workpiece against the contact faces.

5. A machine according to claim 4 having a stop coordinated with each spring whereby the displacement of the spring in the direction of thrust on the workpiece is limited, the stop being so positioned with respect to the workpiece that when an unworked workpiece is retained the spring is lifted off the stop and that when a machined workpiece is placed on the magazine it bears on the stop.

6. A machine according to claim 5 in which the springs are leaf springs and securing or holding pins are provided for fastening the springs on the magazine, each securing or holding pin simultaneously acting as a stop for an adjacent spring.

7. A machine according to claim 1 including a shaft for driving the spindles, the means for stopping the spindles having a permanently acting or electromagnetically operated brake which acts on the spindle itself or on a shaft driving the spindles, and terminal switches which are actuated in a particular angular position of the spindles in order to switch off the drive and/or provide the stopping or braking action.

8. A machine according to claim 7 including a slow-running shaft and a fast-running shaft for driving the spindles, a first terminal switch arranged on the slow-running shaft, the second terminal switch arranged on the fast-running running shaft, the slow-running shaft performing one revolution only during the machining of a workpiece, and an interlock device arranged to prevent actuation of the terminal switch associated with the fast-running shaft, for switching off the drive and/or initiating a braking or stopping action, until the terminal switch associated with the slow-running shaft has been actuated.

9. A machine according to claim 1 including cam plates for controlling the vertical movement of the upper and lower workpiece-gripping spindles whereby the lower workpiece-gripping spindle lifts the workpiece off the magazine before the upper workpiece-gripping spindle presses on the workpiece.